March 13, 1934. A. N. BAUMANN 1,950,836
INTERNAL EXPANDING BRAKE
Filed Dec. 9, 1932 2 Sheets-Sheet 1

Andrew N. Baumann
INVENTOR

Clarence A. O'Brien
ATTORNEY

Andrew N. Baumann
Inventor

Clarence A. O'Brien
Attorney

Patented Mar. 13, 1934

1,950,836

UNITED STATES PATENT OFFICE 1,950,836

INTERNAL EXPANDING BRAKE

Andrew N. Baumann, Ste. Genevieve, Mo., assignor of one-sixth to Emmanuel P. Baumann and one-sixth to Robert A. Fallert, both of Ste. Genevieve, Mo.

Application December 9, 1932, Serial No. 646,430

2 Claims. (Cl. 188—78)

The invention relates to an improvement on the internal expanding brakes. The primary object of the improvement is, to apply more brake band surface to the brake drum by using an improved brake band, which is made in two pieces, each piece having a shoe fastened near each end.

The invention contemplates the use of two sets of cams, which consists of two geared cams to each set. The purpose of these cams is to afford dual expansion for the above mentioned band. This form of expanding brakes is a new idea used in this improved brake.

Another object of the invention is to provide an improved automobile brake which will be durable and efficient in use, one that will be simple, and easy to manufacture, and one which can be placed on the market at a reasonable cost.

A further object of the invention is that it has an inclosed anchor which fastens it to the housing of the automobile, and makes it much easier to be repaired than the present system used on the internal expanding brakes.

The invention will be best understood from a consideration of the following description taken in connection with the accompanying drawings forming a part of the specification, with the understanding however that the invention is not confined to any strict conformity with the showing of the drawings, but may be changed or modified as long as such change or modifications are no material departure from the salient features of the invention as expressed in the appending claims.

Figure 1:
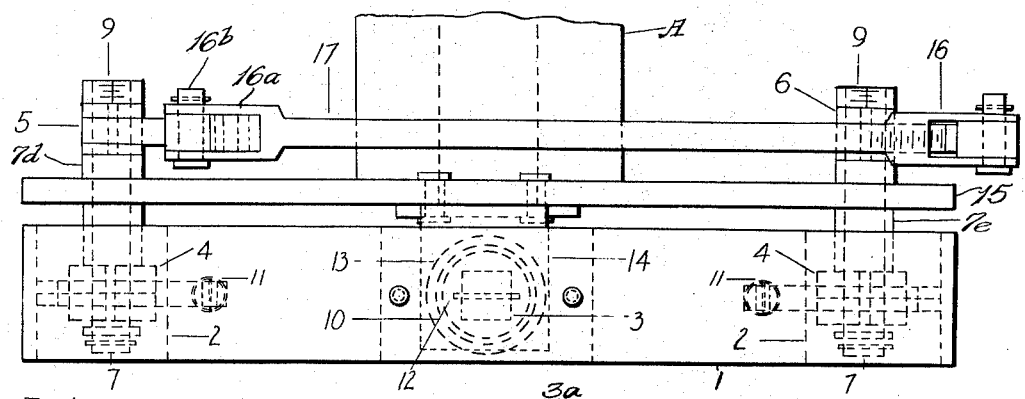
Figure 1 is an orthographic view of the improved dual expanding brake as it would be seen on an automobile.
Figure 2:
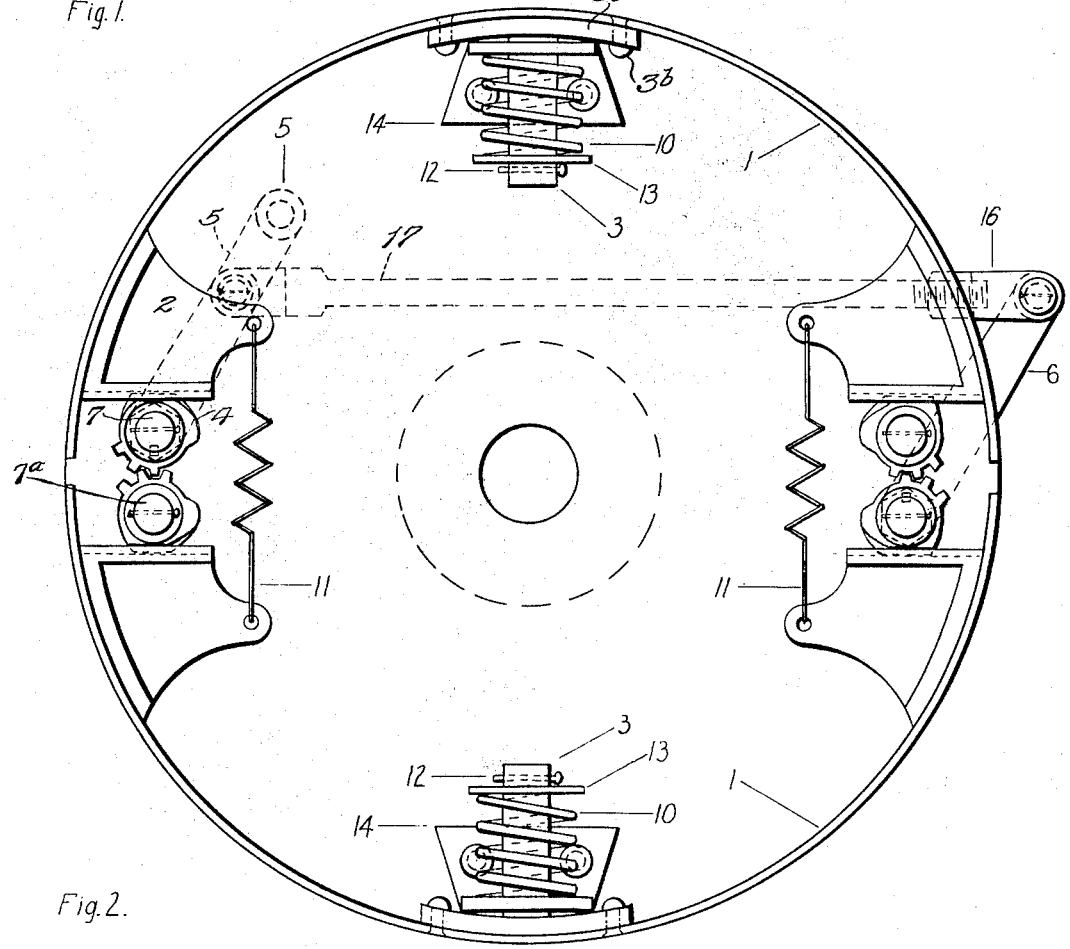
Figure 2 is an orthographic front elevation view of the improved dual expanding brake as it would be seen on an automobile.
Figure 3:
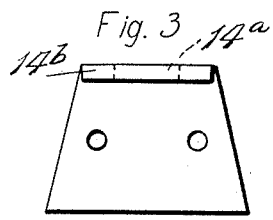
Figure 4:
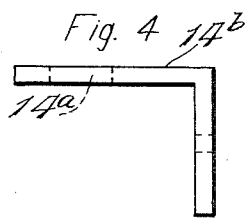

Figures 3, and 4 are orthographic views of the anchor which is used in holding the band in place.

Figure 5:
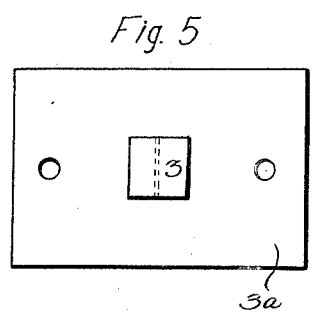
Figure 8:
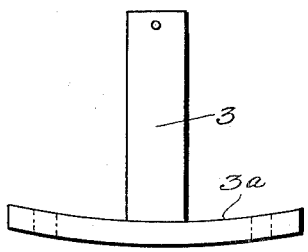

Figures 5, and 8 are orthographic views of the anchor pin which is used in connection with the above anchor.

Figure 6:
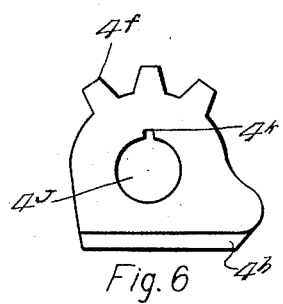
Figure 7:
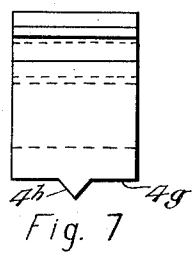

Figures 6, and 7 are orthographic views of the geared cams used in the improved dual expanding brake.

Figure 9:
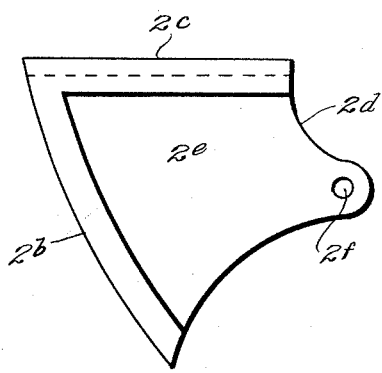
Figure 10:
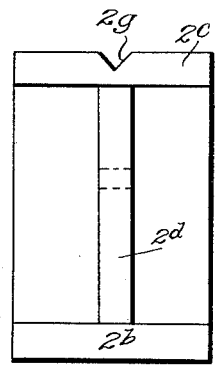

Figures 9, and 10 are orthographic views of the shoe which is fastened to each end of each half of the band.

Referring now to the drawings in detail, wherein like numerals of reference indicate corresponding parts throughout.

In assembling the brake of the present invention it will be understood that the segments of the sectional brake band to be later described, obtain their braking effect when applied, by bearing against an inner face of an inturned flange on a brake drum carried by a rotating wheel, all of which function and structure is conventional in present automobiles and for that purpose is believed to be needless of illustration. In teaching the present invention there is used a stationary plate disk 15 which is a part of the customary brake housing A in automotive practice, which plate is spaced from the inner face of the brake drum to furnish a closed chamber for the brake assembly and also forms both a closure and a support for the working parts of the brake.

The brake band of the present invention is made in two complemental semi-circular segments 1, 1a and formed of smooth metal strips disposed end to end. Over the outer faces of the segments is secured the customary brake fabric not shown. In the center each segment is yieldingly supported on anchor pins 3, the bases 3a of which pins are rigidly secured to the inner faces of the segments by rivets 3b and said pins extend radially inwardly. Each of the anchor pins 3, slide radially in bearing openings 14a formed in the outstanding legs 14b of the right angled anchor brackets 14. There is one anchor bracket 14 for each pin 3 on each segment 1 and 1a and the leg 14c of each bracket is rigidly secured to the inner face of disk plate 15 by rivets 14d.

To make the center of each segment retractile when the braking power is released, there is a helical coil spring 10 encircling the inner portions of each anchor pin 3. The outer end of each spring bears on bracket leg 14b, while the inner end of each spring is anchored by a washer 13 which is held by a cotter pin 12 supported in an opening adjacent the end of each anchor pin 3.

The opposite ends of each brake segment are rigidly secured to a shoe having the configuration of a triangle. The pair of confronting shoes at one side are designated 2 and on the diametrically opposite side 2a. All shoes are the same and referring to Figures 9, 10 a description of one will teach the construction of the other. One side 2b of the shoe is curved to conform to the curvature of the brake segment and is rigidly secured to the inner face of the brake segment adjacent the end. Another side 2c is straight and is formed with a central cam groove 2g coextensive with its length, and in the assembled relation this cam groove is disposed in radial direction as distinguished from an axial direction. It is to be understood that the position of side 2c with regard to a horizontal plane may be changed to any desired angle in order to meet the required brake conditions. The third side of the shoe 2d is actually the edge of a central web 2c which bridges and reinforces the sides 2b and 2c, these latter sides having relatively broad faces as will appear from an inspection of Figures 9, 10. In the center of side 2d is an eye 2f to receive the hooks on the ends of the respective springs 11, which springs 11 urge the companion shoes 2 and 2a toward each other and pull the ends of the brake segments away from the brake drum to prevent brake drag when the brake is released.

In the assembled relation the pair of brake shoes 2 on one side are circumferentially spaced from each other and in the space is juxtaposed power shaft 7 and spindle 7a carrying power gear cam 4 and its intermeshing companion gear cam 4a respectively; while on the opposite sides the pair of shoes 2a are likewise spaced to accommodate power shaft 7c and spindle 7b carrying power gear 4c and its intermeshing companion gear cam 4b respectively. The sides 2c confront each other in the pair of shoes 2 and the pair 2a and the cam grooves 2g are aligned with each other on the respective pairs 2 and 2a. Power shafts 7 and 7c are journalled for rotation in the respective bearing sleeves 7d and 7e, which sleeves are rigidly supported by plate 15 and part of the sleeves are on the inside and part on the outside of the plate 15. The outer ends of the shafts 7 and 7c project free of the end of the outside parts of the bearing sleeves 7d and 7e, to which are rigidly coupled by means of the nuts 9 the lower ends of the respective operating arms 5 and 6. The inner ends of the spindles 7a and 7b are rigidly secured to the plate 15. Gear cams 4a and 4b are rotatably mounted on their respective spindles 7a and 7b, while power gear cams 4 and 4c are keyed to their respective shafts 7 and 7c to rotate therewith when the arms 5 and 6 are moved. All of the gear cams are retained in position by a washer 4d mounted on top of the gear cams, which washer is held in place by a cotter pin 4e seated in an opening in the outer end of the power shafts and spindles.

The power cam gears 4, 4c and gear cams 4a and 4b are similar and it is believed a description of one will teach the construction of all of them. The gear cams are substantially cylindrical. On an arc of their peripheries there are formed any number of projecting gear teeth 4f which mesh with the gear teeth on its companion gear so as to impart breaking power from one to the other. Another portion of the periphery, preferably diametrically opposite the gear teeth, is made with a flat cam surface 4g from the center of which projects a tongue 4h. The flat cam surface 4g bears on side 2c of the shoes, and the tongue 4h seats in groove 2g. In the center each gear is provided with an opening 4j to receive the power shafts and spindles. Power gear cams 4—4c are formed with key slots 4k, while in the gear cams 4a—4b the opening 4j is without the key slot.

The outer end of arm 6 and an intermediate portion of arm 5 are adjustably connected together to operate in unison by link 17. To accomplish this purpose, one end of link 17 is formed with an integral apertured fork 16a which straddles arm 5 and is connected thereto by a removable pin 16b. The other end of link 17 is threadably connected to the crown of fork 16 and the legs of this fork are apertured to receive the connecting pin similar to the pin 16b which pin connects fork 16 to the upper end of power arm 6. The free end of arm 5 is formed with an eye for connection to the link (not shown) leading from the brake lever or pedal.

I am aware that internal expanding brakes have been constructed heretofore in two semi-circular segments. In my brake however, I have a retracting support intermediate the ends of the brake segments which not only overcomes brake drag at that point but provides a radial support that anchors the band in place and insures uniform brake contact in a true circle. The springs connecting the companion pairs of shoes provides quick release at the ends of the segments and at the same time cause uniform contact between the cam surfaces on the shoes and gear cams to insure equal application of brake presure at the ends of the segments. Wide bearing surface and tongue and groove connections between cam surfaces on gear cams and shoes prevent lateral twist at the ends of the segments. By using companion pairs of gear cams I provide uniform outward pressure to each end of each segment which overcomes the tendency of twisting found in similar brakes using a single cam between the ends of the segments. In using a single cam there is an outward pressure at one end of one segment, while there is an opposite pressure or inward pressure at the confronting end of the other segment. Moreover it is pointed out that the tension of retractile springs connecting the ends of the shoes is at an angle to the tension of the retractile springs in the center of the shoe which opposed forces accelerate the release of the brakes.

Having described my invention what I claim is:—

1. In a brake mechanism of the class described comprising a stationary supporting plate, a pair of internal expanding brake segments supported by said stationary plate intermediate their ends so as to retract radially, a shoe secured to each end of the segments and formed with a cam surface directed chordwise with respect to the circular brake surface, a pair of gear cams for the confronting ends of the segments and one gear cam of each pair bearing against one shoe cam surface of each segment, a retractile connection between the confronting shoes of the segments, and an adjustable link connecting the pairs of gear cams together to operate the pairs of gear cams in unison.

2. In a brake mechanism of the class described comprising a stationary supporting plate, a pair of internal expanding brake segments supported by said stationary plate intermediate their ends so as to retract radially, a shoe secured to each end of the segments and formed with a cam surface directed chordwise with respect to the circular brake surface, a pair of gear cams for the confronting ends of the segments and one gear cam of each pair bearing against one shoe cam surface of each segment, a retractile connection between the confronting shoes of the segments, and an adjustable link connecting the pairs of gear cams together to operate the pairs of gear cams in unison, said cam surface of the shoe formed with a groove, and said gear cams formed with a tongue to seat in the groove to prevent the shoes from twisting.

ANDREW N. BAUMANN.